United States Patent
Nastronero et al.

[11] 3,924,233
[45] Dec. 2, 1975

[54] ACTIVE-PASSIVE TARGET DETECTION SYSTEM

[75] Inventors: John J. Nastronero, Corona; John C. Billings, Riverside, both of Calif.

[73] Assignee: The United States of America as represented by the Secretary of the Navy, Washington, D.C.

[22] Filed: Apr. 10, 1969

[21] Appl. No.: 817,256

[52] U.S. Cl. ......... 343/6 R; 102/70.2 P; 343/6 ND; 343/7 PF
[51] Int. Cl.². F42C 13/02; F42C 13/04; G01S 9/02
[58] Field of Search .......... 102/70.2 P; 343/6, 7 PF, 343/5 PD, 6 ND

[56] References Cited
UNITED STATES PATENTS

| | | | |
|---|---|---|---|
| 3,076,961 | 2/1963 | Bibbero | 343/6 |
| 3,155,971 | 11/1964 | Hansel | 343/6 X |
| 3,269,314 | 8/1966 | Varian | 102/70.2 P |

Primary Examiner—Malcolm F. Hubler
Attorney, Agent, or Firm—Richard S. Sciascia; Joseph M. St. Amand; T. M. Phillips

[57] ABSTRACT

An active-passive target detection system which includes two passive channels both of which are optical and detect and fuze on infrared energy radiated by the target aircraft. An active channel, which may be either radio frequency or optical, is also used which detects and fuzes on the doppler signal generated at intercept with the target aircraft. A logic circuit into which all channels feed serves to select the most effective channel or combination of channels for a given intercept situation.

4 Claims, 2 Drawing Figures

JOHN J. NASTRONERO
JOHN C. BILLINGS
INVENTOR.

ACTIVE-PASSIVE TARGET DETECTION SYSTEM

STATEMENT OF GOVERNMENT INTEREST

The invention herein described may be manufactured and used by or for the Government of the United States of America for governmental purposes without the payment of any royalties thereon or therefor.

BACKGROUND OF THE INVENTION

1. Field of the Invention

The present invention relates to active-passive target detecting systems for use as an influence or proximity type fuzing system on small air-to-air and surface-to-air missiles and where no target intercept parameters are furnished to the fuzing system from the guidance system.

2. Description of the Prior Art

Prior known active-passive systems have used active and passive channels which are interdependent. Both detector devices must provide coincident signals to detonate the warhead.

SUMMARY OF THE INVENTION

The present invention provides two optical passive channels which detect and fuze on the infrared energy radiated by the target aircraft. One channel is used for head-on attacks and the other is used for rear attacks. An active radio frequency channel is utilized which detects and fuzes on the doppler signal generated at intercept with the target aircraft. A logic circuit selects the most effective one of the channels for a given attack situation. The three channels, in combination, provide optimum warhead burst control under all conditions of intercept (including head-on, rear or crossing attacks) with all types of targets, small as well as large.

BRIEF DESCRIPTION OF THE DRAWING

Other objects and many of the attendant advantages of this invention will become readily appreciated as the same becomes better understood by reference to the following detailed description when considered in connection with the accompanying drawings wherein.

DESCRIPTION OF THE PREFERRED EMBODIMENT

Figure 1:
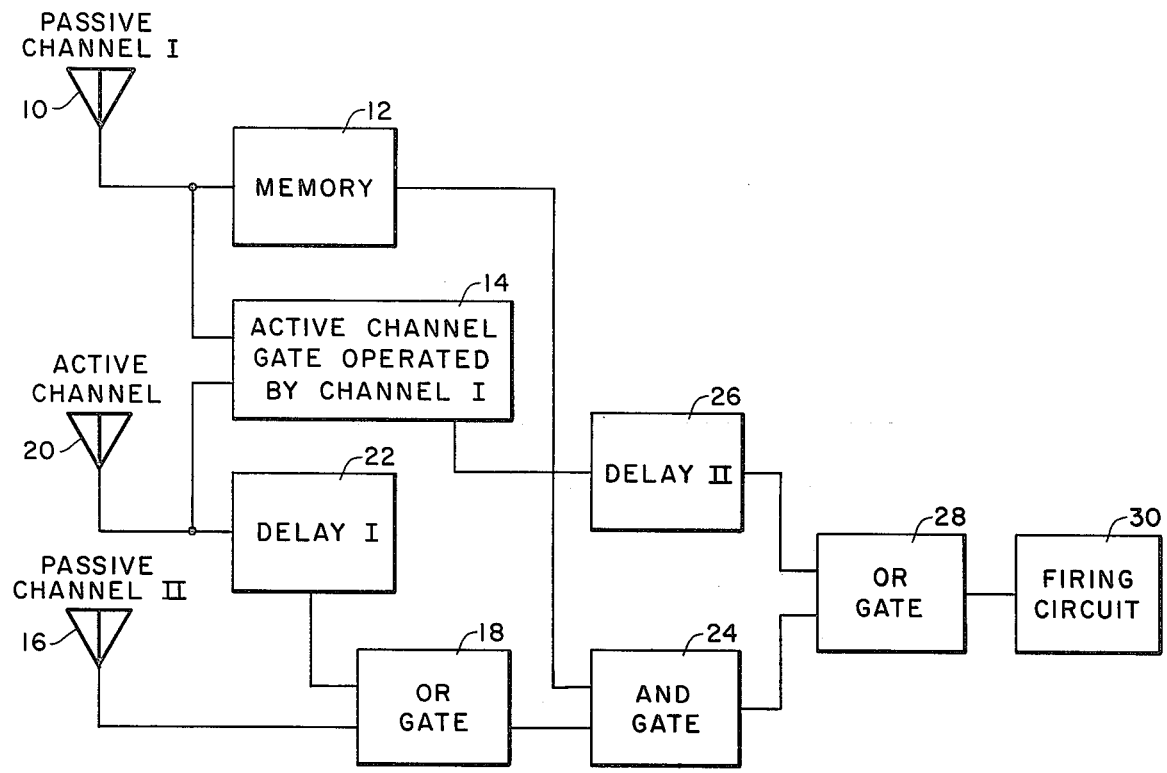
FIG. 1 is a block diagram of a preferred embodiment of the invention.
Figure 2:
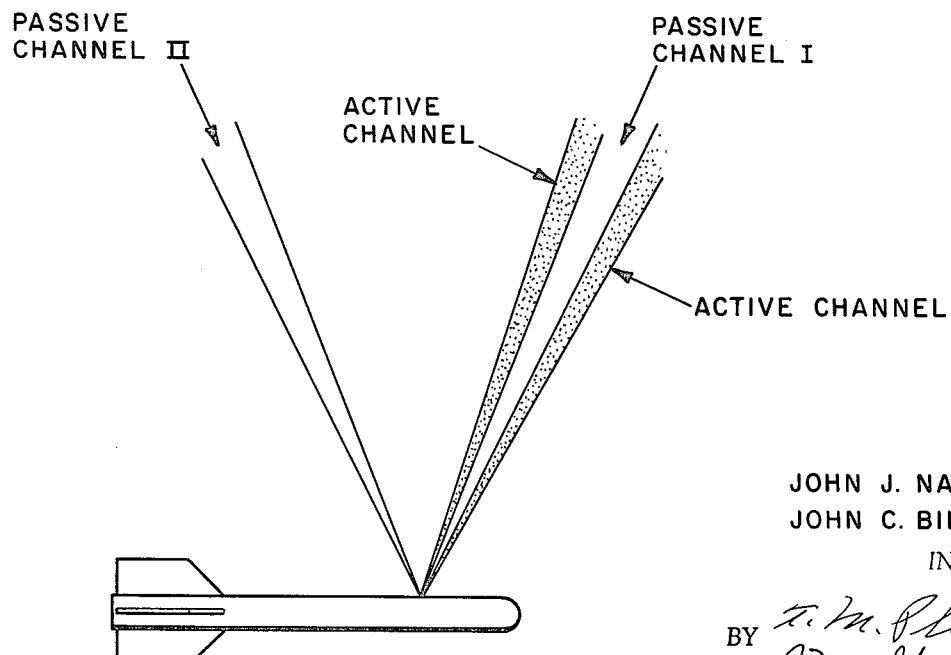
FIG. 2 is a representative showing of the detecting beams corresponding to the three detecting channels of FIG. 1.

Three target detecting signals are generated by three different detectors positioned in the missile with fields of views such that each detector detects a target when in a particular geometrical relationship with the missile. Passive Channel I and the active channel both look in the forward direction. Passive Channel II is looking in the backward direction.

Signals detected by signal generating element 10 of Passive Channel I are fed to a memory circuit 12 and to active channel gate circuit 14. Signals detected by signal generating element 16 of passive channel II are fed to OR gate 18. Signals detected by signal generating element 20 of the active channel are fed through delay circuit 22 to OR gate 18 and to active channel gate 14. The outputs of memory circuit 12 and OR gate 18 are fed to AND gate 24. The output of active channel gate 14 is fed through a delay circuit 26 as an input to OR gate 28 while the output of AND gate 24 is fed as another input to OR gate 28. A signal appearing at the output of OR gate 28 is fed to firing circuit 30.

In operation, a signal generated in passive Channel I which precedes a signal in the other channels is presumed to be a target radiation, indicating that the intercept is of the rear hemisphere category. The Channel I signal disables active channel gate 14 and simultaneously initiates memory circuit 12 which applies a signal as one input to AND gate 24 for a predetermined time, thereby momentarily placing the system in a tail attack mode. The subsequent appearance and abrupt disappearance of a signal in passive Channel II during the memory time of memory circuit 12, would provide a second input signal to AND gate 24, thus, passing a firing signal to firing circuit 30.

During the memory time (30–50 ms) of memory circuit 12, if a signal is generated by the active channel and is passed through delay circuit 22 to OR gate 18 before the signal in passive channel II drops off, the active channel signal will be passed by AND gate 24 and OR gate 28 to firing circuit 30.

If no signal is received in either passive channel II or the active channel within the memory time of memory circuit 12, passive Channel I and active gate 14 are reset to receive a new target signal.

A signal that appears in the active channel prior to the presence of a signal in passive Channel I indicates a head-on attack and is passed through active channel gate 14, delay circuit 26 and OR gate 28 to initiate a firing signal in firing circuit 30 at the termination of the delay of delay circuit 26.

The memory time of memory circuit 12, the delays of delay circuits 22 and 26, and the three detection beam angles may be selected to provide optimum fuze effectiveness for all conditions of intercept against all types of targets.

What is claimed is:

1. In an active-passive target detection system, the combination comprising:
   a. A first passive target detecting means for generating a first passive signal in response to a first predetermined geometrical encounter with the target,
   b. a second passive target detecting means for generating a second passive signal in response to a second predetermined geometrical encounter with the target,
   c. an active target detecting means for generating an active signal in response to said first predetermined geometrical encounter with the target,
   d. logic circuit means coupled to said first and second passive and active target detecting means and having an output.
   e. firing circuit means coupled to the output of said logic circuit means for generating a firing pulse in response to a signal received from said logic circuit means,
   f. said logic circuit means being responsive to the appearance and disappearance of a target signal in said second passive target detecting means during the persistence of a target signal from said first passive target detecting means to pass a signal to said firing circuit means,
   g. said logic circuit means being responsive to a signal appearing in said active target detecting means prior to the appearance of a signal in said first passive target detecting means to pass a signal to said firing circuit.

2. The active-passive target detection system of claim 1 wherein said logic circuit means includes:
   a. a memory circuit having an input coupled to said first passive target detecting means and having an output,
   b. a gate circuit having a first input coupled to said first passive target detecting means, a second input coupled to said active target detecting means and having an output,
   c. a first delay circuit means having an input coupled to said active target detecting means and having an output,
   d. a first OR gate circuit having a first input coupled to the output of said first delay circuit means, a second input coupled to said second passive target detecting means and having an output,
   e. an AND gate having a first input coupled to the output of said memory circuit, a second input coupled to the output of said first OR gate circuit and having an output,
   f. a second delay circuit having an input coupled to the output of said gate circuit and having an output,
   g. a second OR gate circuit having a first input coupled to the output of said second delay circuit, a second input coupled to the output of said AND gate circuit and having an output.

3. The target detecting system of claim 2 wherein said gate circuit is normally open and is turned off when a target signal appears in said first passive target detecting means prior to the appearance of a target signal in said active target detecting means.

4. The target detecting system of claim 2 wherein a signal received in said active target detecting means during the memory time of said memory circuit will be coupled through said first delay circuit means to said first OR gate circuit causing an output signal from said logic circuit.

* * * * *